US009824514B2

(12) United States Patent
Hauhn

(10) Patent No.: US 9,824,514 B2
(45) Date of Patent: Nov. 21, 2017

(54) APPLYING GEOGRAPHICAL LIMITATIONS TO CONTROL ACTIONS OF A SECURITY SYSTEM

(71) Applicant: Joseph E. Hauhn, Hillsboro Beach, FL (US)

(72) Inventor: Joseph E. Hauhn, Hillsboro Beach, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 14/177,398

(22) Filed: Feb. 11, 2014

(65) Prior Publication Data

US 2015/0229626 A1 Aug. 13, 2015

(51) Int. Cl.
| | |
|---|---|
| *H04L 29/06* | (2006.01) |
| *G07C 9/00* | (2006.01) |
| *H04W 4/02* | (2009.01) |
| *H04L 12/28* | (2006.01) |
| *H04W 12/08* | (2009.01) |
| *G08B 26/00* | (2006.01) |

(52) U.S. Cl.
CPC ............. *G07C 9/00* (2013.01); *H04L 12/282* (2013.01); *H04L 63/107* (2013.01); *H04W 4/021* (2013.01); *H04W 12/08* (2013.01); *G06F 2221/2111* (2013.01); *G06F 2221/2149* (2013.01); *G08B 26/00* (2013.01)

(58) Field of Classification Search
CPC ............. G06F 2221/2149; G06F 21/35; G06F 2221/2111; H04L 9/0872; H04L 63/107; H04L 12/2816; H04W 4/021
See application file for complete search history.

(56) References Cited

U.S. PATENT DOCUMENTS

| | | | |
|---|---|---|---|
| 8,350,694 B1 * | 1/2013 | Trundle et al. .......... 340/539.11 |
| 9,111,111 B1 * | 8/2015 | Ramaswamy ...... G06F 21/6218 |
| 2005/0239481 A1 * | 10/2005 | Seligmann ................. 455/456.2 |
| 2006/0022816 A1 * | 2/2006 | Yukawa ........................ 340/521 |
| 2007/0055672 A1 * | 3/2007 | Stevens .............. G06F 17/3087 |
| 2010/0174914 A1 * | 7/2010 | Shafir ........................... 713/186 |
| 2011/0096007 A1 * | 4/2011 | Kitagawa et al. ............ 345/173 |
| 2012/0210399 A1 * | 8/2012 | Jennings .......................... 726/4 |
| 2012/0319825 A1 * | 12/2012 | Shimy ................. H04L 12/2818 340/12.5 |
| 2012/0328101 A1 * | 12/2012 | Lakshminarayanan ....... 380/258 |
| 2013/0097682 A1 * | 4/2013 | Zeljkovic .............. H04L 9/3231 726/7 |
| 2013/0332007 A1 * | 12/2013 | Louboutin ............ H04W 4/021 701/2 |
| 2014/0297527 A1 * | 10/2014 | McLaughlin et al. .......... 705/44 |

OTHER PUBLICATIONS

Robles et al., "A Review on Security in Smart Home Development", 2010, pp. 13-22.*

* cited by examiner

*Primary Examiner* — Thaddeus Plecha
(74) *Attorney, Agent, or Firm* — Fish & Richardson P.C.

(57) ABSTRACT

Apparatus for applying geographical limitations to control actions of a security system is described. The apparatus receive location data from a user device, determines whether location data has the user device within a predetermined distance range from the security system and cause a message to be sent to the security system to perform the control action specified in the request when the processor determines that the user device is within the predetermined distance range.

16 Claims, 5 Drawing Sheets

APPLYING GEOGRAPHICAL LIMITATIONS TO CONTROL ACTIONS OF A SECURITY SYSTEM

BACKGROUND

This description relates to controlling a security system.

It is common for businesses and homeowners to have a security system for detecting alarm conditions at their premises and signaling the conditions to a monitoring station or to authorized users of the security system. Generally, a user can access a security system to control the security system by directly interacting with hardware, e.g., a control panel, of the security system. For example, the user can enter a security code (or PIN) at the hardware. Alternatively or additionally, the user can also access the security system through a user device that is not part of the security system, e.g., a portable handheld device. Such a handheld device can be a mobile device including a smart phone, a tablet, a laptop, etc. that executes one or more applications to access/control the security system. The user device can be local or remote relative to the security system and can interact with the security system through a network, e.g., a wired network or a wireless network.

SUMMARY

According to an aspect of the invention, a system comprises circuitry that receives location data from a user device that sends a request to access a security system to perform a control action on the security system using the user device, and determine whether the location data received from the user device has the user device within a predetermined distance range from the security system. The predetermined distance range is chosen as a range in which the security system can be activated to perform the control action. The processor can cause a message to be sent to the security system to perform the control action specified in the request when the processor determines that the user device is within the predetermined distance range.

The above techniques can include additional features and one or more of the following advantages.

Safety of the security system can be improved by implementing one or more geographical limitations on one or more groups of control actions to be performed by a security system. The security system can perform a control action upon request of an authorized user, e.g., authenticated by one or more authentication processes, sent from a user device that is located within a predetermined distance range associated with the control action, so that the user's control action on the security system can be well-tracked and/or in compliance with regulatory standards. Different groups of control actions can be associated with different predetermined distance ranges, and the user can be enabled to request the security system to perform control actions in different groups as the user moves from one location to another. Additionally, performance of the control action by the security system can be further protected by other parameters, such as time of the day or week, user's job functions, etc.

The details of one or more embodiments of the invention are set forth in the accompanying drawings and the description below. Other features, objects, and advantages of the invention are apparent from the description and drawings, and from the claims.

DETAILED DESCRIPTION

Figure 1:
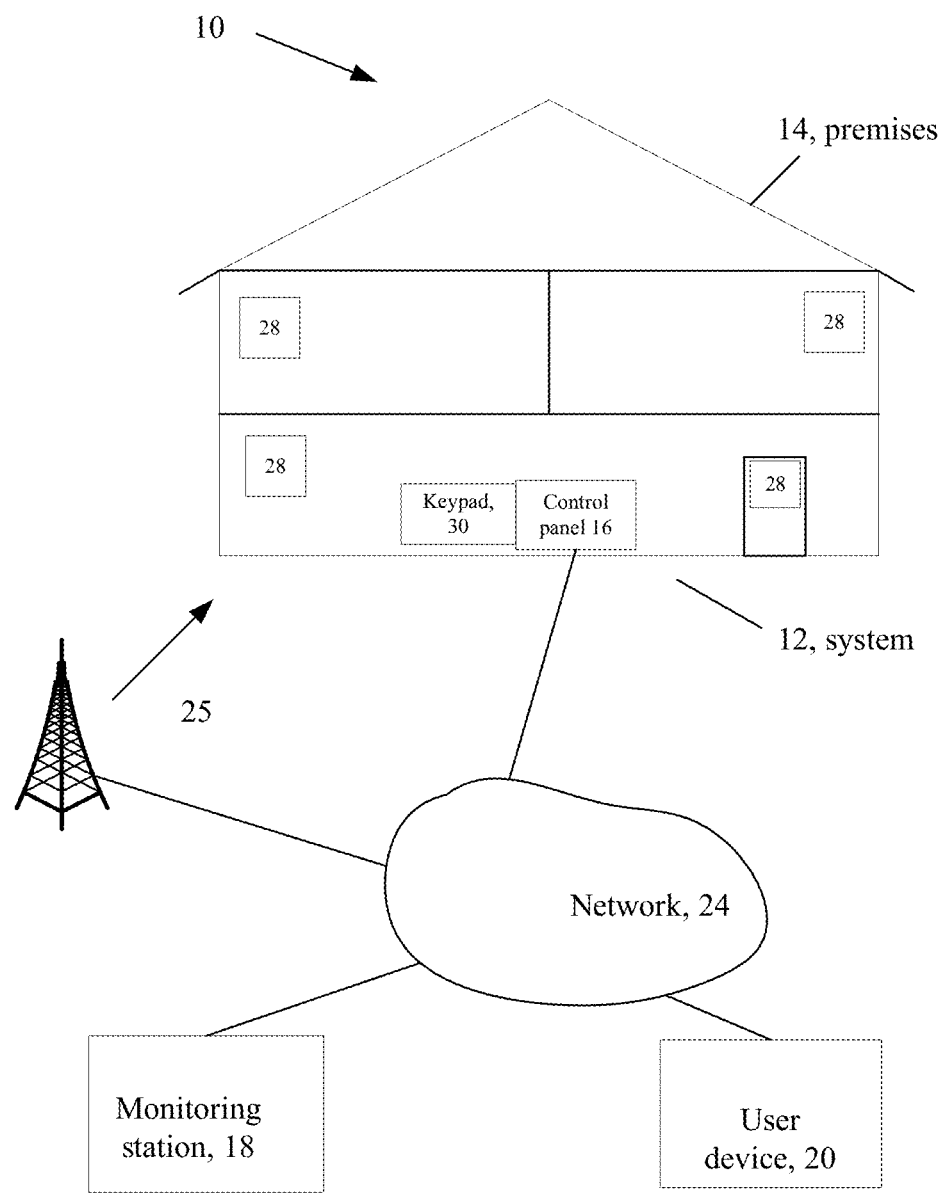
FIG. 1 is a schematic diagram of an example security system at a premises.

Generally, authorized users can gain access to a security system to request the security system to perform one or more control actions. Access can be local (or direct) by physically interacting with a control panel of the security system. Alternatively, access to the security system can be remote (or indirect) through a user device that interacts with the security system via one or more applications installed on the user device. Examples of the control actions include arming or disarming or changing settings of the security system. In some implementations, the security system is configured to perform the control action(s) specified in the request when the users are determined to be authorized persons for such requests.

Users can be authenticated by one or more authentication processes implemented by the security system, a remote monitoring station in communication with the security system, the user device, and/or the one or more applications.

As described below the security system is configured such that the security system performs certain control action(s) as requested by an authorized user only when the request for the control actions is sent by the user within a geographical area. For example, a security system may be disarmed only when the user is within a predetermined distance range from the security system. In this example, the user can disarm the security system at the premises by interacting directly with the hardware of the security system, or through a user device that is located within the predetermined distance range, e.g., 100 feet from the security system.

The geographical limitation imposed on the control actions can improve the safety of the security system. In the example of disarming the security system, a user disarming the security system locally at the security system or within the predetermined range of the security system may be captured by a security camera so that if the user is unauthorized (although he/she may have been authenticated), the unauthorized control action can be traced, e.g., through the security camera.

In some implementations, geographical limitations are not imposed on all control actions that can be taken by a security system. Some control actions are selected to be restricted by the geographical limitations based on industry standards or based on user preferences. Sometimes the same predetermined distance range may be applied to multiple control actions.

An authorized user, e.g., the owner of the security system, may choose or make changes to the control actions on which the geographical limitations are imposed and/or the predetermined distance ranges for the control actions. In some implementations, some control actions and their respective predetermined distance ranges are set by the manufacturer of the security system and are protected from changes throughout the life of the security system.

In situations where an authorized user sends a request for a control action from a user device, the user device can include a global positioning system (GPS). Examples of the user device include Personal Digital Assistants (PDAs), tablets, smart phones and other similar devices. The GPS of the user device can ubiquitously determine the location of the user device, and therefore, the location of the user and the location from which the request for the control action is sent. The location information or data can be obtained by the one or more applications run on the user device for interacting with the security system, which can be forwarded to a central monitoring station for use in determining whether the user device is within the predetermined distance range for the control action.

In some implementations, the one or more applications may determine the distance between the user device and the security system using the GPS of the user system. A message is sent to the user, e.g., displayed or voiced to the user, if the distance is out of the predetermined range. If the user device is determined to be within the predetermined range, the application(s) contacts the central monitoring station or the security system to activate the security system to perform the requested control action.

Referring now to FIG. 1 an arrangement 10 including a security system 12 at premises 14 is shown. In this arrangement 10, the premises 14 is a residential house, but the premises may alternatively be any type of premises, e.g., commercial, industrial, buildings etc. The security system 12 includes a control panel 16, sensors/detectors 28 and a keypad 30. The security system 12 is in communication with a central monitoring station 18 and one or more authorized user devices 20 (only one shown) through one or more data networks 24 (only one shown), such as the Internet. The control panel 16 is in communication with one or more detectors 28 and receives information about the status of the monitored premises from the detectors 28. Examples of detectors 28 include motion detectors, video cameras, glass break detectors, noxious gas sensors, smoke/fire detectors, microphones, contact/proximity switches, and others. The detectors 28 may be hard wired to the control panel 16 or may communicate with the control panel 16 wirelessly. The detectors 28 sense the presence of motion, glass breakage, gas leaks, fire, and/or breach of an entry point, among others, and send information to the control panel 16 and/or to the user device 20. Based on the information received from the detectors, the control panel 16 determines whether to trigger alarms, e.g., by triggering one or more sirens (not shown) at the premises 14 and/or sending alarm messages to the monitoring station 18 and/or to the user device 20.

A user may access the control panel 16 to control the security system, e.g., disarm the security system, arm the security system, enter predetermined standards for the control panel 16 to trigger the alarms, stop the alarms that have been triggered, add new detectors, change detector settings, view the monitoring status in real time, etc. The access can be made directly at the premises 14, e.g., through the keypad 30 connected to the control panel. In some implementations, the control panel 16 may also include a display (not shown) that shows a graphical user interface to assist a user's control of the security system. The display may be a touch screen such that the user may interact with the control panel and the security system directly through the display.

The user may also access the control panel 16 through the user device 20, which can be at or be remote from the premises 14. To allow a user to access the control panel 16 through the user device 20, and to protect the security system from unauthorized accesses, the control panel 16, the monitoring center 18, and/or the user device implements one or more levels of authentication, including user biometric authentication. The authentication(s) can also be based on input from a user, such as a security code or a PIN provided to the user, a password created by the user, and/or an RFID chip provided to the user. Examples of the authentication process are discussed in U.S. Ser. No. 14/177,432, filed on Feb. 11, 2014, the entire content of which is incorporated herein by reference.

For selected control actions that are requested by a user through a user device, before or after the one or more authentication processes are implemented, the monitoring center 18 and/or the application(s) of the user device 20 determines whether the user device 20 is within predetermined geographical distance ranges in which the security system 12 can be activated to perform the respective control actions. The security system 12 performs a control action only when the request for the control action is sent from a user device located within a corresponding predetermined geographical distance range. For other control actions for which no predetermined geographical distances are specified, the security system 12 performs these control actions once the required authentication processes are successfully completed.

The distance between the user device 20 and the security system 12 can be determined in various ways. In one example, the user device 20, e.g., a handheld device includes a GPS system for locating the position of the device 20. The distance between the user device and the security system is determined based on the location data obtained from the GPS system and the location of the security system known to the monitoring center 18 and/or the application(s) of the user device 20.

Figure 2:
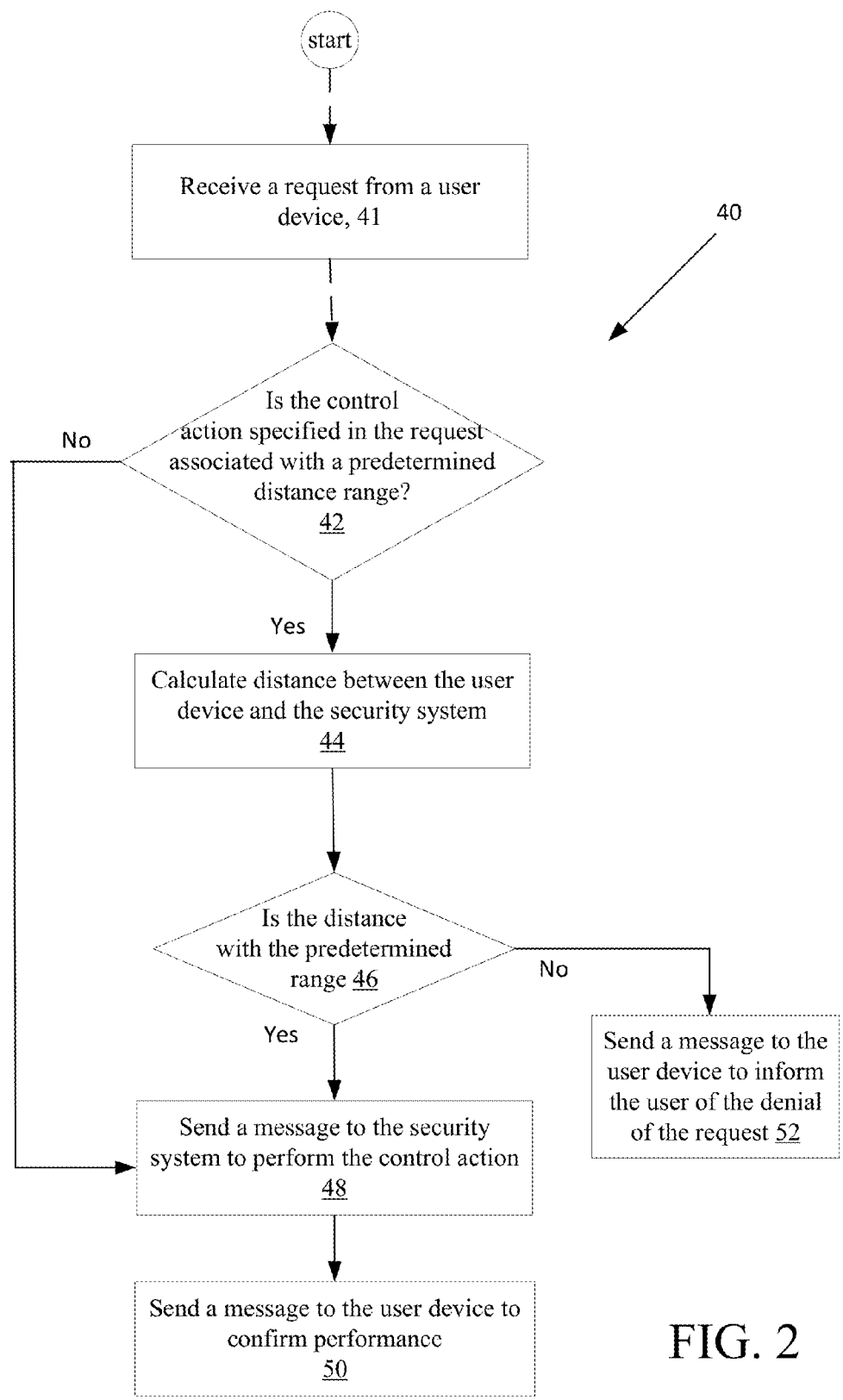
FIG. 2 is a flow diagram showing an example process performed by a processor at a monitoring center.

Referring to FIG. 2, an example process 40 performed by a processor at a monitoring center, such as the monitoring center 18 of FIG. 1 is shown. The processor at the monitoring center receives 41 a request that has been sent from a user device, such as the user device 20. The request is sent to access the security system 12 to perform a control action. Before or after (as indicated by the dashed lines) one or more authentication processes have been successfully implemented that authenticate the user sending the request from the user device as a person authorized to access the security system and send the request, the processor determines 42 whether the control action specified in the request is associated with a predetermined distance range. In other words, the processor determines whether the control action is geographically limited by a predetermined distance range. If there is no such limitation, then the processor sends 48 a message to a control panel of the security system so that the security system performs the control action specified by the request.

If there is a geographical limitation on the control action specified by the request, then the processor determines 44 the distance between the user device and the security system. The determination is made based on location data collected by the GPS in the user device. This location data is received with the request for the control action. If the location data has not been received, the processor may request the user device to send the data. The processor further determines 46 whether the calculated or the received distance is within the predetermined distance range set for the control action. If it is, the processor sends 48 a message to the security system for the security system to perform the requested control action. The predetermined distance range for different control actions may be stored in a database accessible by the processor, e.g., at the monitoring center or remotely from the monitoring center. After receiving confirmation of the performance from the security system, the processor sends 50 another message to the user device to inform the user that the requested control action has been performed.

If the distance is out of the predetermined distance range, the processor sends 52 a message to the user device to inform the user that the request for the control action is denied. The message may further inform the user the reason for the denial, i.e., the user device is out of the predetermined distance range from the security system, to help the user to make corrections, e.g., move to be within the predetermined distance range relative to the security system before sending the request for the control action again.

The example process 40 can be implemented with variations.

The authentication process(es) can be performed by the user device, the security system, the monitoring center, and/or a combination of two or more of these systems or devices. In addition, after determining that there is a predetermined distance range associated with the requested control action, the processor at the monitoring center may send the information about the predetermined distance range to the user device. In some implementations, the user device may calculate its distance to the security system and, based on the received predetermined distance range, the user device may send an indication to the user, e.g., through a display or a voice, that informs the user whether the user's request will be granted or denied based on the calculated distance being within or outside of the predetermined range. The user may receive the indication from the user device before receiving the confirmation message in step 50 or the denial message in step 52. Alternatively, in some implementations, the user device may calculate the distance between the user device and the security system, e.g., based on the location data of the user device collected by the GPS and the location of the security system known to the application(s) of the user device. Instead of calculating the distance, the processor at the monitoring center then receives the calculated distance from the user device.

Figure 3:
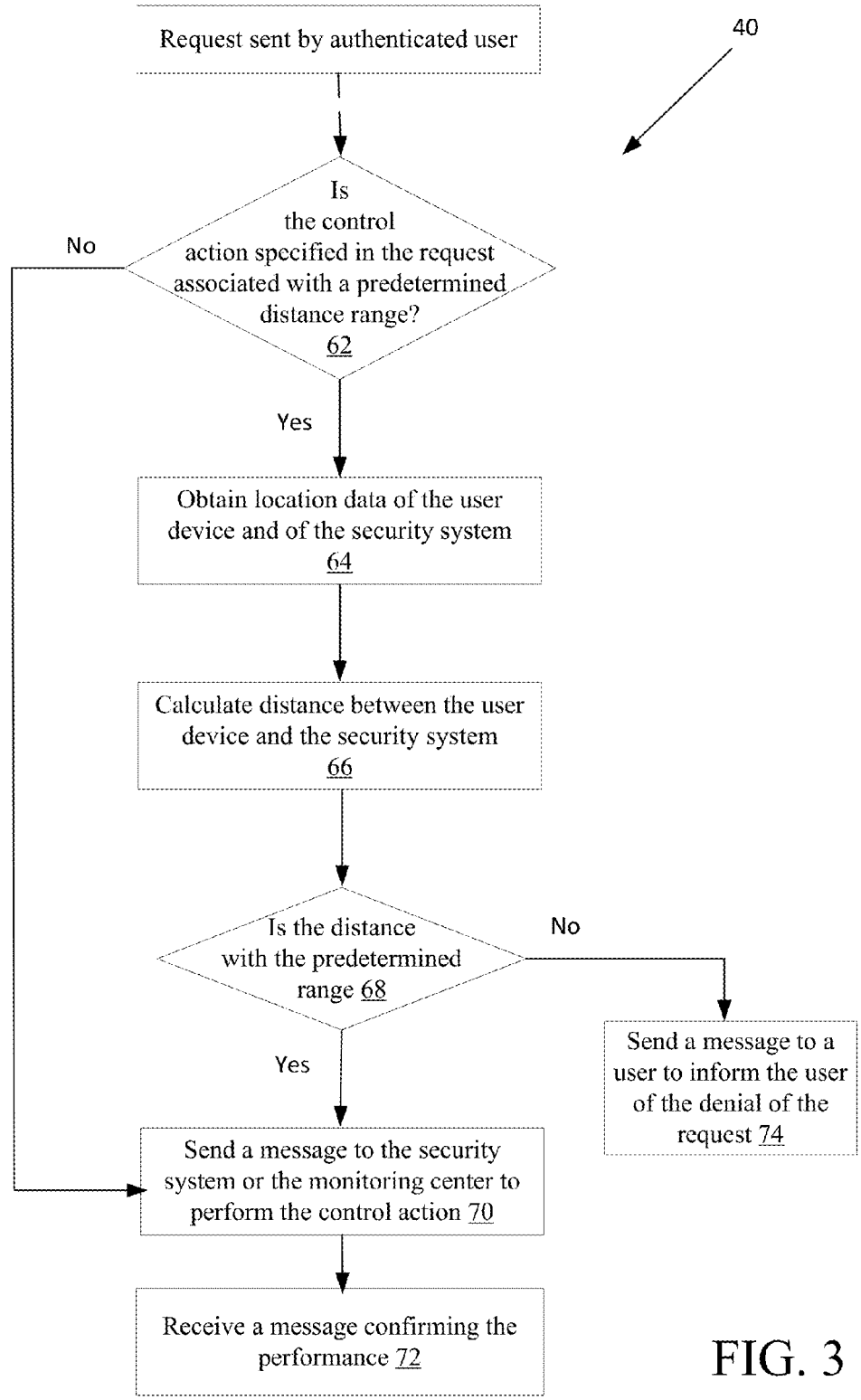
FIG. 3 is a flow diagram showing an example process performed by a processor of a user device.

Referring to FIG. 3, another example process 60 performed by a processor of a user device, such as the user device 20 of FIG. 1, in which a request sent from the user device, for a security system, such as the security system 12, to perform a control action is shown. After the user sending the request from the user device is authenticated to be a person authorized to access the security system, the application(s) installed on the user device for interacting with the security system is run to cause the processor to determine 62 whether the control action specified in the request is associated with a predetermined distance range. The processor of the user device may make the determination by obtaining information about settings of the security system. The settings may be stored in a database at the security system, at the monitoring center, or at the user device in association with the application(s). If there is no geographical limitation imposed on the requested control action, then the application(s) causes the processor to send 70 a message to the security system or to the monitoring center for the security system to perform the control action. If there is a geographical limitation, the processor obtains 64 location data of the user device and of the security system. In particular, the processor can obtain the location data of the user device from a GPS on the user device and the location data of the security system from the stored data associated with the application(s) at the user device, at the security system, or at the monitoring center.

The processor calculates 66 the distance between the user device and the security system, and determines 68 whether the calculated distance is within the predetermined distance range. If the user device is within the predetermined range, the processor sends 70 a message to the security system or the monitoring system for the security system/monitoring system to perform the control action. The processor receives 72 a confirmation message from the security system or the monitoring system to confirm the performance of the control action. If the device is out of the predetermined range the processor sends 74 a message, e.g., through a display or speech to the user to inform the user that the request cannot be processed. The message may also explain that the user needs to move closer to or re-position himself/herself in relation to the security system before the request can be processed.

The example process 60 can be implemented with variations. For example, instead of implementing the authentication process(es) before the process 60 starts in step 62, the authentication process(es) can be performed immediately before the step 70 in which the processor sends a message to the security system to perform the requested control action. The authentication process(es) can be performed by the user device, the security system, the monitoring center, and/or a combination of two or more of these systems or devices.

In some implementations, multiple geographical limitations can be imposed on multiple groups of control actions, each group including one or more control actions. Some groups of control actions can be requested within an overlapping area. For example, when a first group of control actions requires requests to be sent within 0-X feet from the security system, where X is a positive number, and a second group of control actions requires requests to be sent within 0-Y feet from the security system, where Y is a positive number smaller than X, then within 0-Y feet from the security system, both the first and second groups of control actions can be requested. Sometimes one group of control actions may be requested in a distance range that does not overlap with another distance range corresponding to another group of control actions. As a user moves from one distance to another relative to a security system, one group of control actions becomes enabled while another group of control actions is disabled. For example, according to regulatory requirements, a user is required to be within a protected area, e.g., within 100 feet to the security system, when disarming the security system. A group of control actions including disarming the security system can be enabled when the user is within 100 feet of the security system. Once the user moves outside of the protected area, a different group of control action is enabled, which does not include the disarming functionality.

In some implementations, additional parameters can be used to control whether one or more groups of control actions can be enabled within certain predetermined distance ranges from the security system. Suitable additional parameters can include user job functions and/or time. For example, for certain users of a particular job function and during the work week, a group of control functions can be enabled within one distance range from the security system, while for the same users of the particular job function and during the weekend, a different group of control functions can be enabled within the distance range from the security system.

The predetermined distance ranges can be stored in association with the corresponding groups of control actions, with or without additional parameters, such as the user job functions and time, in a database stored in memory or a storage device of the monitoring center, the security system, and/or the user device.

In some implementations, when the application(s) is run on a user device through which a user interacts with a security system, the user device automatically determines its location relative to the security system using a GPS system of the user device. The user device may retrieve the stored information about different groups of control actions and their associated distance ranges and possibly other parameters, locally from the user device or remotely from the monitoring center or the security system, and display the retrieved the information to the user. For example, a user device may display, automatically or in response to a user's inquiry, to the user the group of control actions that can be enabled at the current location of the user and the user device. Such display can dynamically or continuously change as a user moves from one location to another location with the user device. Optionally, the user device may also inform the user the required distance range for a control action about which the user inquires and guide the user to a location that is within the required distance range.

Referring back to FIG. 1, the data network 24 may include any combination of wired and wireless links capable of carrying packet switched traffic, and may span multiple carriers, and a wide geography. In one embodiment, the data network 24 may simply be the public Internet. In another embodiment, the data network 24 may include one or more wireless links, and may include a wireless data network, e.g., with tower 25, such as, but not limited to, a 2G, 3G, 4G or LTE cellular data network. The panel 16 may be in communication with the network 24 by way of Ethernet switch or router (not illustrated). The panel 16 may therefore include an Ethernet or similar interface, which may be wired or wireless. Further network components, such as access points, routers, switches, DSL modems, and the like possibly interconnecting the panel 16 with the data network 24 are not illustrated.

Figure 4:
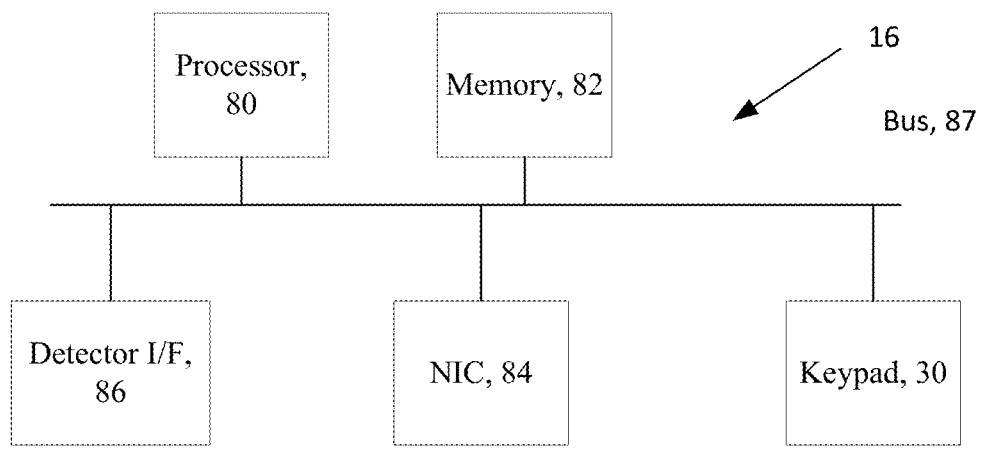
FIG. 4 is a block diagram showing an example of a control panel of a security system.

Referring now to FIG. 4, an example of a control panel 16 of FIG. 1 is shown. The control panel 16 includes a processor 80 in communication with memory 82, a detector interface 86 for communicating with the detectors 28, and a network interface 84 for communicating with the data network 24 that are connected together via a bus 87 or the like. The keypad 30 can form part of the panel 16 to allow entry of codes, e.g., for arming or disarming the security system. The control panel 16 may also include other components (not shown), such as a speaker, power supply, LCD/LED display and the like. Optionally, the panel 16 may include tamper sensors, and a back-up power supply such as a battery, allowing the panel to operate even if the system loses power or has been physically removed from where the control panel was mounted. Further, the panel 16 may allow for two-way voice communication between the premises 14 and the monitoring station 18 and/or between the premises 14 and one or more user devices 28.

The memory 82 stores program instructions and data used by the processor 80 of the control panel 16. The memory 82 may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users by the control panel 16 before granting the users with accesses to a security system that includes the control panel 16. The configuration and operating data may include data for use in the one or more authentication processes (or authentication data) and one or more predetermined distance ranges associated with one or more groups of control actions and possibly other parameters (or geographical data).

In some implementations, the memory 82 only stores authentication data and the distance data in association with the groups of control actions and possibly other parameters for the security system to which the memory 82 belongs. In some implementations, the control panel 80 also includes a storage device that stores a database (not shown) containing the authentication data and the geographical data, and the memory and the processor can access the database to retrieve necessary data for performing the authentication processes and enabling processes for the security system to perform the requested control actions. Alternatively or in addition, the data may be stored external to the control panel 16, e.g., at the monitoring station 18 or other locations, such that when the control panel 16 needs any of the data, the control panel retrieves the necessary data externally.

The program instructions stored in the memory 82 of the panel 16 may further store software components allowing network communications and establishment of connections to the data network 24. The software components may, for example, include an internet protocol (IP) stack, as well as driver components for the various interface, including the interfaces 84 and 86 and the keypad 30. Other software components suitable for establishing a connection and communicating across network 24 will be apparent to those of ordinary skill.

Program instructions stored in the memory 82 of the control panel 16, along with configuration data may control overall operation of the panel 16. In particular, program instructions control how the panel 16 may be transitioned between its armed and disarmed states, and how the panel 16 reacts to sensing a condition at a detector 28 that may signify an alarm. Moreover, one or more data network addresses for signaling alarm conditions may be stored in the memory 82 of the control panel 16. These network addresses may include the network addresses (e.g. IP) by which the monitoring station 18 may be reached. Example control panels may comprise DSC® models PC1864 and PC9155, SCW915x suitably modified to operate as described herein.

Figure 5:
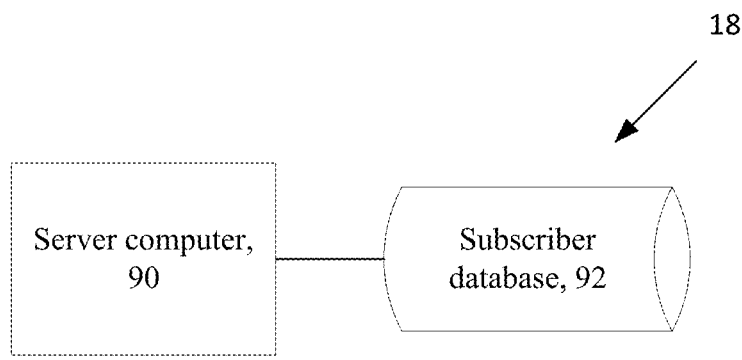
FIG. 5 is a block diagram showing an example of part of a monitoring center.

An example monitoring station 18 is shown in FIG. 5. The monitoring station 18 is depicted as a single physical monitoring station or center in FIG. 1. However, it could alternatively be formed of multiple monitoring centers/stations, each at a different physical location, and each in communication with the data network 24. The central monitoring station 18 includes one or more monitoring server(s) 90 each processing messages from the panels 16 and/or user devices 20 of subscribers serviced by the monitoring station 18. Optionally, a monitoring server 90 may also take part in two-way audio communications or otherwise communicate over the network 24, with a suitably equipped interconnected panel 16 and/or user device 20.

The monitoring server 90 may include a processor, a network interface and a memory (not shown). The monitoring server 90 may physically take the form of a rack mounted card and may be in communication with one or more operator terminals. An example monitoring server 90 is a SURGARD™ SG-System III Virtual, or similar receiver.

The processor of each monitoring server 90 acts as a controller for each monitoring server 90, and is in communication with, and controls overall operation, of each server 90. The processor may include, or be in communication with the memory that stores processor executable instructions controlling the overall operation of the monitoring server 90.

Suitable software enabling each monitoring server 90 to authenticate users for different security systems, determine whether a requested control action can be performed at the security system based on the location of a user device from the request is sent, or to perform other functions may be stored within the memory of each monitoring server 90. Software may include a suitable Internet protocol (IP) stack and applications/clients.

Each monitoring server 90 of central monitoring station 18 may be associated with an IP address and port(s) by which it communicates with the control panels 16 and/or the user devices 20, e.g., to authenticate users, to handle alarm events, etc. This IP address may be static, and thus always identify a particular one of monitoring server 90 to the computing devices, panels, etc. communicating over the network 24. Alternatively, the dynamic addresses could be used, and associated with static domain names, resolved through a domain name service. The network interface may be a conventional network interface that interfaces with the network 24 (FIG. 1) to receive incoming signals, and may for example take the form of an Ethernet network interface card (NIC). The operating terminal(s) may be computers, thin-clients, or the like, to which received data representative of an alarm event is passed for handling by human operators. Each terminal may include a monitor, a keyboard, microphone, and an audio transducer/speaker. An operator, at the terminal may further be able to establish outgoing telephone calls, to the police or third party security personnel. To that end, the terminal may be proximate a PSTN telephone, or may include or have access to voice-over-IP software (running at the server 90, or elsewhere) allowing establishment of outgoing telephone calls to parties associated with the premises 14 (as identified in database 92), third parties, such as police, security personnel, or the like.

The monitoring station 18 may further include, or have access to, a subscriber database 92 that includes a database under control of a database engine. The database 92 may contain entries corresponding to the various subscribers to panels like the panel 16 that are serviced by the monitoring station 18. For example, the entries may contain user information, including authentication data, the names and addresses, phone number, contact phone number, for each subscriber, and the geographical data. The database 92 may also include the particulars of each detector 28 of a security system, the unique identifier of each panel 16 assigned to a particular subscriber, account information, and the like. In addition, authentication data, control activities, and/or alarm data received from the panel 16 may be logged or archived in the database 92. In some implementations, the data can be sorted and stored based on its association with different panels 16 or different security systems.

Figure 6A:
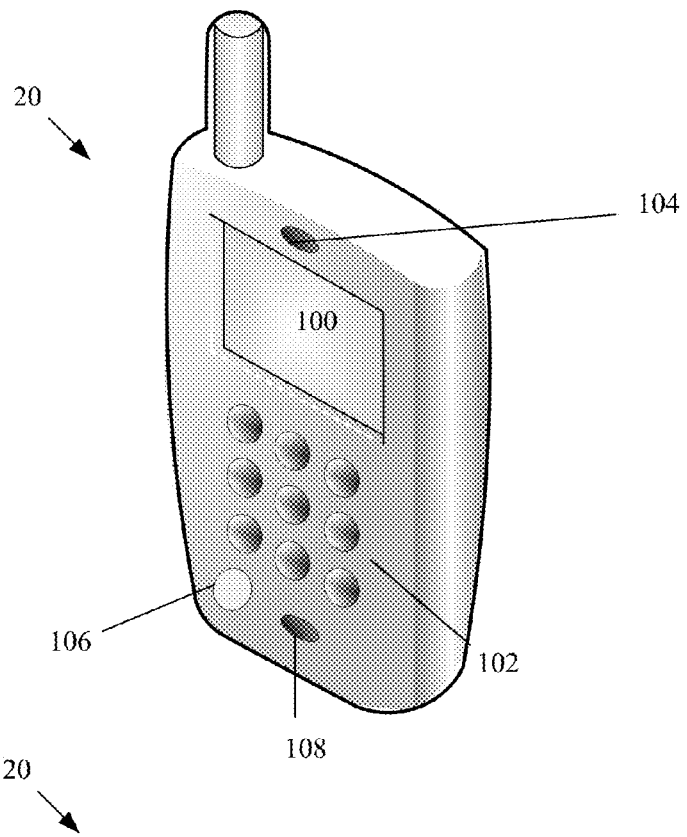
FIGS. 6A and 6B are a block diagram showing an example of a user device.

Referring to FIG. 6A, an example user device 20 includes a display 100 and a keypad 102. In some implementations, the user device 20 is a smart phone. The keypad 102 may be a physical pad, or may be a virtual pad displayed in part of the display 100. A user may interact with the application(s) run on the user device 20 through the keypad 102 and the display 100. The user device 20 also includes a camera 104, a speaker phone 106, and a microphone 108.

Figure 6B:
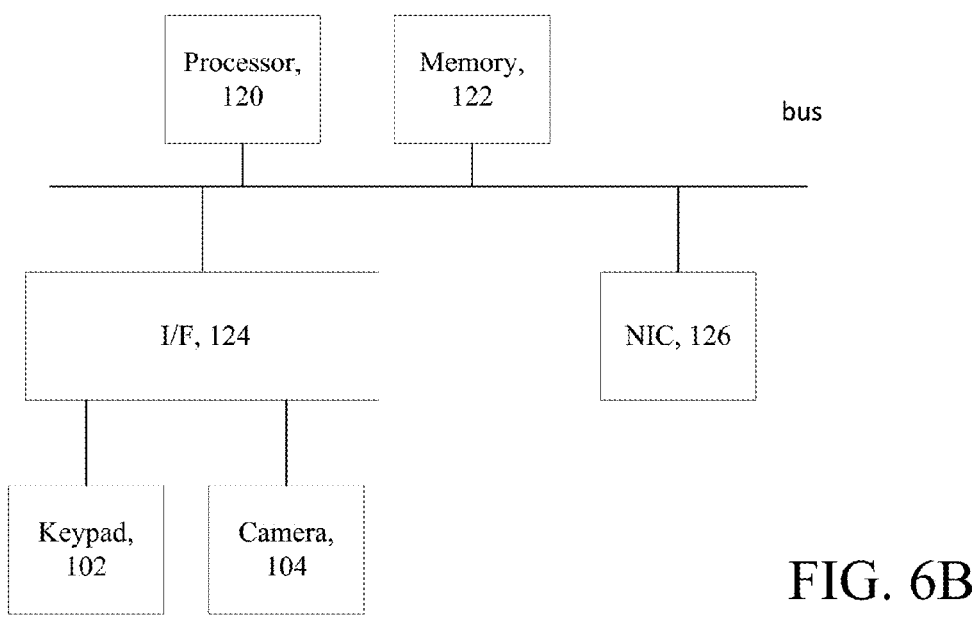

Structurally, referring also to FIG. 6B, the example user device 20 of FIG. 6A also includes a processor 120 for executing software instructions and perform functions, such as the user device's original intended functions, such as cell phone calls, Internet browsing, etc., and additional functions such as user authentication processes for a security system, communications with the security system and/or the monitoring station of the security system, and/or applications of the geographical limitations to control actions to be performed by the security system. A memory 122 of the user device 20 stores the software instructions and/or operational data associated with executing the software instructions. Optionally, the instructions and the data may also be stored in a storage device (not shown) of the user device 20. The user device 20 also includes one or more device interfaces 124 that provide connections among the different elements, such as the camera 104, the display 100, the keypad 102, the processor 120, the memory 122, etc., of the user device 20. The user device further includes one or more network interfaces 126 for communicating with external network(s), such as the network 24 of FIG. 1, and other devices.

Although certain embodiments of the methods and systems are described, variations can be included into these embodiments, or other embodiments can also be used. Other embodiments are within the scope of the following claims.

What is claimed is:

1. A central control system comprising:
   circuitry including a processor device that is configured to:
   receive an access request to a security system, the request received from an application executing on a portable user device that includes a global positioning system transceiver, which access request is a request to perform a control action to configure the security system by sending the request from the portable user device from the application on the portable user device;
   determine by the central control system whether the control action is of a type that requires the portable user device to be within a predetermined distance range from the security system, the predetermined distance range being chosen as a range in which the security system can be activated by the application on the portable user portable device to perform the control action;
   receive location data from the global positioning system transceiver in the portable user device;
   for access requests that require the portable user device to be within a predetermined range, determine whether the location data received from the portable user device has the portable user device within the predetermined distance range from the security system; and
   cause a message to be sent to the security system to perform the control action specified in the request when the circuitry including the processor device determines that the portable user device is within the predetermined distance range.

2. The central control system of claim 1, wherein the processor is also caused to:
   authenticate a user for accessing and performing the control action on the security system.

3. A central control system comprising:
   a processor device;
   memory in communication with the processor device; and
   a storage device that stores a program of computing instructions for execution by the processor device using the memory, the program of computing instructions configured to cause the processor device to:
   receive an access request from an application executing on a user device, which application causes messages including one or more control actions to be sent to the central control system to configure a security system;

determine by the central control system whether the one or more control actions is of a type that requires the user device to be within a predetermined distance range from the security system, the predetermined distance range being chosen as a range in which the security system can be activated by the application on the user device to perform the one or more control actions;

receive location data from a global positioning system transceiver device in the user device that sends the access request;

determine from the received location data and a known location of the security system whether the location data received has the user device within the predetermined distance range about the security system;

cause a message to be sent to the security system to perform the one or more control actions specified in the request of the type when the processor device determines that the user device is within the predetermined distance range.

4. The central control system of claim 3, wherein the processor is also caused to authenticate a user for accessing and performing the one or more control actions on the security system by applying biometric authentication.

5. The central control of claim 4, wherein the biometric authentication comprises receiving biometric information of the user from a security camera.

6. The central control system of claim 3, wherein the processor is also caused to send a message to the user device after the security system performs at least one of the one or more control actions, which action is an action that disarms the security system, and the predetermined distance range is 0-100 feet.

7. The central control system of claim 3, further comprising the user device.

8. A portable user device comprises:
a processor device;
memory in communication with the processor device; and
a storage device that stores a program of computing instructions for execution by the processor using the memory, the program of computing instructions configured to cause the processor to:
send an access request to a central system from an application executing on the portable user device, which configures a security system by sending a control action from execution of the application on the portable user device;
receive from the security system configuration information that defines settings with respect to a predetermined range within which to perform control actions on the security system;
determine by the central control system whether the control action is of a type that requires the portable user device to be within a predetermined distance range from the security system, the predetermined distance range being chosen as a range in which the security system can be activated by the application on the portable user device to perform the control action;
access global position location information determined from a location of the portable user device using a global positioning system;
execute on the portable user device, the application that is further configured to determine from the global position location information and the settings whether the portable user device is within the predetermined range to remotely control one or more functions of the security system by the control action; and when within the predetermined distance range send by the portable user device the control action to the security system.

9. The user device of claim 8, wherein the processor is also caused to:
send information about a user of the user device to a remote server to authenticate the user for accessing and performing the control action on the security system; and
receive an indication of authentication prior to the control action being sent.

10. The user device of claim 9, wherein the information about the user comprises biometric information.

11. The user device of claim 8, wherein the user device is a smart phone.

12. The user device of claim 8, wherein the user device is a tablet computing device.

13. The user device of claim 8, wherein the processor is also caused to:
receive information about whether or not the control action on the security system requires that the user device is within the predetermined range of the security system.

14. A method comprising:
receiving by a central control system, an access request from an application executing on a user device, which access request is a request that configures a security system by sending a control action from execution of the application on the user device;
receiving by the central control system from a global positioning system included in the user device, location data that specifies a current location of the user device;
determining by the central control system whether the control action is of a type that requires the device to be within a predetermined distance range from the security system, the predetermined distance range being chosen as a range in which the security system can be activated by the application on the user device to perform the control action;
determining by the central control system whether the location data received from the user device has the user device within the predetermined distance range from the security system, the predetermined distance range being chosen as a range in which the security system can be activated by the application on the user device to perform the control action; and
causing by the central control system, a message to be sent to the security system to perform the control action specified in the request when the computing device determines that the user device is within the predetermined distance range.

15. A central control system comprising:
one or more server computer systems, each comprising a processor and memory, with at least one of the one or more server computers configured to:
receive an access request from an application executing on a portable user device that includes a global positioning system transceiver, which access request is to perform a control action to configure a security system;
determining by the central control system whether the control action is of a type that requires the portable device to be within a predetermined distance range from the security system, the predetermined distance range being chosen as a range in which the security system can be activated by the application on the portable user device to perform the control action;

receive location data from the global positioning system transceiver in the portable user device;

access settings data associated with the security system, the settings data including a location of the security system and the predetermined distance range;

calculate from the received location data and the settings data whether the portable user device is within the predetermined distance range;

receive authentication data that authenticates a user to cause performance of the control action on the security system; and cause a message to be sent to the security system to perform the control action specified in the request of the type when the one or more server computers determine that the portable user device is within the predetermined distance range and the user is authenticated to perform the control action.

16. The central control system of claim 15, wherein at least one processor of the one or more servers is also caused to:

send by the one or more computer systems to the portable user device a confirmation that the control action has been performed by the security system.

* * * * *